US 7,847,261 B2

(12) United States Patent
Tomita et al.

(10) Patent No.: US 7,847,261 B2
(45) Date of Patent: Dec. 7, 2010

(54) RADIATION DETECTOR

(75) Inventors: Yasuhiro Tomita, Shizuoka (JP); Yuji Shirayanagi, Shizuoka (JP); Shinjiro Matsui, Shizuoka (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 521 days.

(21) Appl. No.: 11/993,391

(22) PCT Filed: Jun. 30, 2005

(86) PCT No.: PCT/JP2005/012124

§ 371 (c)(1),
(2), (4) Date: Dec. 20, 2007

(87) PCT Pub. No.: WO2007/004269

PCT Pub. Date: Jan. 11, 2007

(65) Prior Publication Data

US 2010/0156644 A1     Jun. 24, 2010

(51) Int. Cl.
*G01T 1/161* (2006.01)

(52) U.S. Cl. ................................. 250/370.11

(58) Field of Classification Search ............. 250/336.1, 250/363.1, 363.02, 370.1, 370.11; 340/600
See application file for complete search history.

(56) References Cited

U.S. PATENT DOCUMENTS

| 4,598,202 | A | * | 7/1986 | Koechner | .................... | 250/366 |
| 4,801,803 | A | * | 1/1989 | Denen et al. | ............. | 250/336.1 |
| 4,889,991 | A | * | 12/1989 | Ramsey et al. | ........... | 250/336.1 |
| 5,541,415 | A | * | 7/1996 | Shonka | ....................... | 250/374 |
| 6,135,955 | A | * | 10/2000 | Madden et al. | ............. | 600/436 |
| 6,218,669 | B1 | * | 4/2001 | Call | ...................... | 250/370.11 |
| 6,331,703 | B1 | * | 12/2001 | Yarnall et al. | ............ | 250/336.1 |
| 6,484,050 | B1 | * | 11/2002 | Carroll et al. | ................ | 600/436 |
| 2002/0117627 | A1 | * | 8/2002 | Jimbo et al. | ........... | 250/370.13 |

FOREIGN PATENT DOCUMENTS

| JP | 63-075588 | 4/1988 |
| JP | 2-198385 | 8/1990 |
| JP | 9-189770 | 7/1997 |
| JP | 10-96782 | 4/1998 |
| JP | 2004-93456 | 3/2004 |
| JP | 2005-207954 | 8/2005 |
| WO | WO 03/010557 | 2/2003 |

* cited by examiner

*Primary Examiner*—David P Porta
*Assistant Examiner*—Marcus H Taningco
(74) *Attorney, Agent, or Firm*—Drinker Biddle & Reath LLP

(57) ABSTRACT

A detecting unit (2) detects radiation. A data acquiring block (34) creates basic data equivalent to the count per unit time of the detected radiation. A data processing block (40) compares the basic data with a threshold and generates a annunciation control signal when the basic data is above the threshold. An annunciation block (42) generates a detection sound in response to the annunciation control signal. A computing block (38) computes the threshold by using a coefficient specified by means of an input device (18) and the maximum value of the basic data stored in a storage block (36). When the user repetitively examines a region (50) to be measured while gradually increasing the threshold, the region where the detection sound is generated is gradually narrowed. With this, a portion (53) where radiation is concentrated in the region (50) can be found out.

6 Claims, 4 Drawing Sheets

(a)

(b)

(c)

(d)

RADIATION DETECTOR

TECHNICAL FIELD

The present invention relates to a radiation detector.

BACKGROUND ART

Japanese Published Unexamined Patent Application No. H02-198385 has disclosed a handheld medical radiation detector that detects a gamma-ray source.

DISCLOSURE OF THE INVENTION

In a measurement of a radioisotope concentration by use of a handheld radiation detector, normally, the concentration is simply judged according to the size of a measurement value obtained by the detector. However, it is often difficult according to only the size of the measured value to specify a site where radioactivity is concentrated within an area where radioactivity is distributed.

Therefore, the present invention aims to provide a radiation detector that can easily specify a site where radioactivity is concentrated.

A radiation detector of the present invention includes: a detecting portion that detects radiation to generate a detection signal; a data obtaining portion that generates basic data equivalent to a radiation count value per a predetermined unit time based on the detection signal; a first input device used for inputting a start signal that instructs on starting storing of a maximum value of the basic data; a storing portion that stores the maximum value of the basic data in response to the start signal; a second input device used for inputting information to designate a threshold to the basic data; a data processing portion that compares the basic data with the threshold and generates a notification control signal if the basic data exceeds the threshold; and a notifying portion that executes notification in response to the notification control signal.

This radiation detector may further include a threshold operation portion that calculates the threshold by use of the maximum value stored in the storing portion. The threshold operation portion may calculate the threshold according to the following expression: $C_t = n \times C_m$ (here, $C_t$ denotes the threshold, $C_m$ denotes the maximum value of basic data, and a coefficient n satisfies $0 < n \leq 1$). As the information to designate the threshold, information to designate the coefficient n may be inputted by use of the second input device.

This radiation detector may further include a third input device used for inputting a stop signal that instructs on stopping storing of the maximum value. The storing portion may stop storing of the maximum value in response to the stop signal.

This radiation detector may include a single switch that functions as both the first and third input devices. Either the start signal or the stop signal may be inputted according to how this switch is operated.

The detecting portion may generate a pulse signal as the detection signal. The data obtaining portion may count the pulse signal and generate a value reflecting a count value of the pulse signal per the unit time as the basic data.

The detecting portion may generate an electrical charge as the detection signal. The data obtaining portion may generate a value reflecting a total amount of electrical charge received from the detecting portion over the unit time as the basic data.

The present invention will be more readily understood by the following detailed description in conjunction with the accompanying drawings. Also, the accompanying drawings are provided for the purposes of illustration only, and are not intended to limit the scope of the present invention.

BEST MODES FOR CARRYING OUT THE INVENTION

Figure 1:
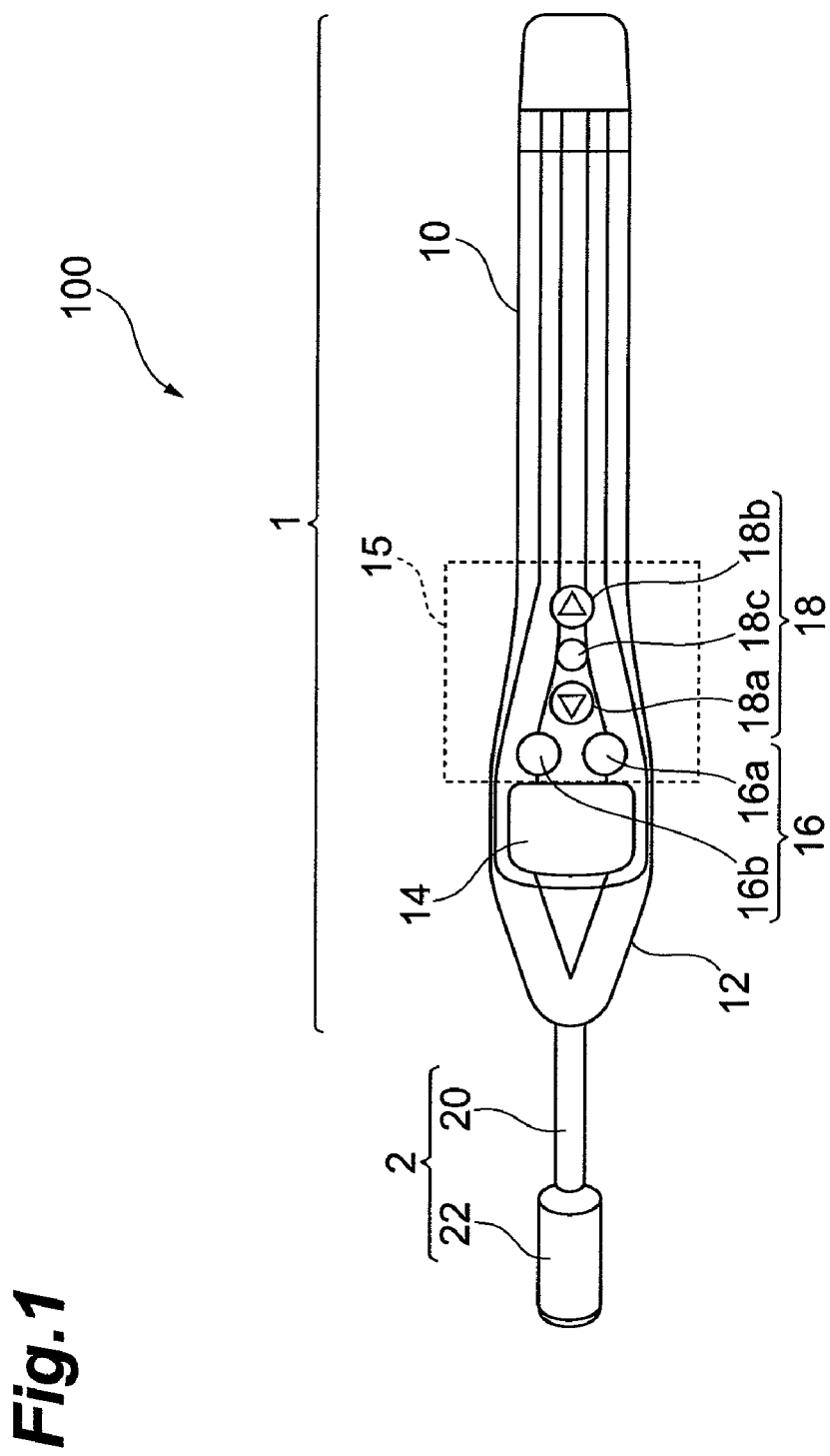
[FIG. 1] A plan view showing a radiation detector of an embodiment.

Hereinafter, an embodiment of the present invention will be described in detail with reference to the accompanying drawings. Here, in the description of the drawings, identical elements are denoted with identical reference numerals so as to avoid overlapping descriptions.

The present invention relates to a handheld cordless radiation detector 100. FIG. 1 is a plan view showing the radiation detector 100. As shown in FIG. 1, the radiation detector 100 is comprised of a slender housing 1 and a radiation detecting portion 2 extending from a front end of the housing 1.

The housing 1 is a hollow body having a shape almost symmetrical around its central axis. The housing 1 has a handle 10 to be grasped by a user of the radiation detector 100 and a trunk portion 12 connected to the front end of the handle 10. In the trunk portion 12, provided is a display unit 14 to display various types of information concerning radiation detection and an operating portion 15 to be used by the user so as to control the radiation detector 100.

The radiation detecting portion 2 has a slender cylindrical support member 20 protruded from the front end of the housing 1 and a radiation detection probe 22 attached to a front end of the support member 20. A base end of the support member 20 is connected to the center of a front-end portion of the housing 1. The probe 22 includes a radiation detector element (not shown) and a collimator (not shown). Upon receiving radiation photons that come flying, the radiation detector element generates an electrical detection signal according to physical information possessed by the radiation photons. Examples of the detection signal that may be mentioned include a pulse signal having a pulse height according to an energy possessed by radiation photons and an electrical charge (current) according to the number or energy of radiation photons. In addition, the radiation detector element may be a semiconductor element, or may be a combination of a scintillator that emits light due to an incidence of radiation and a photoelectric converter that detects the emission. The collimator cuts off radiation that comes flying from an undesirable direction toward the radiation detector element to thereby enhance directivity of the radiation detector.

Figure 2:
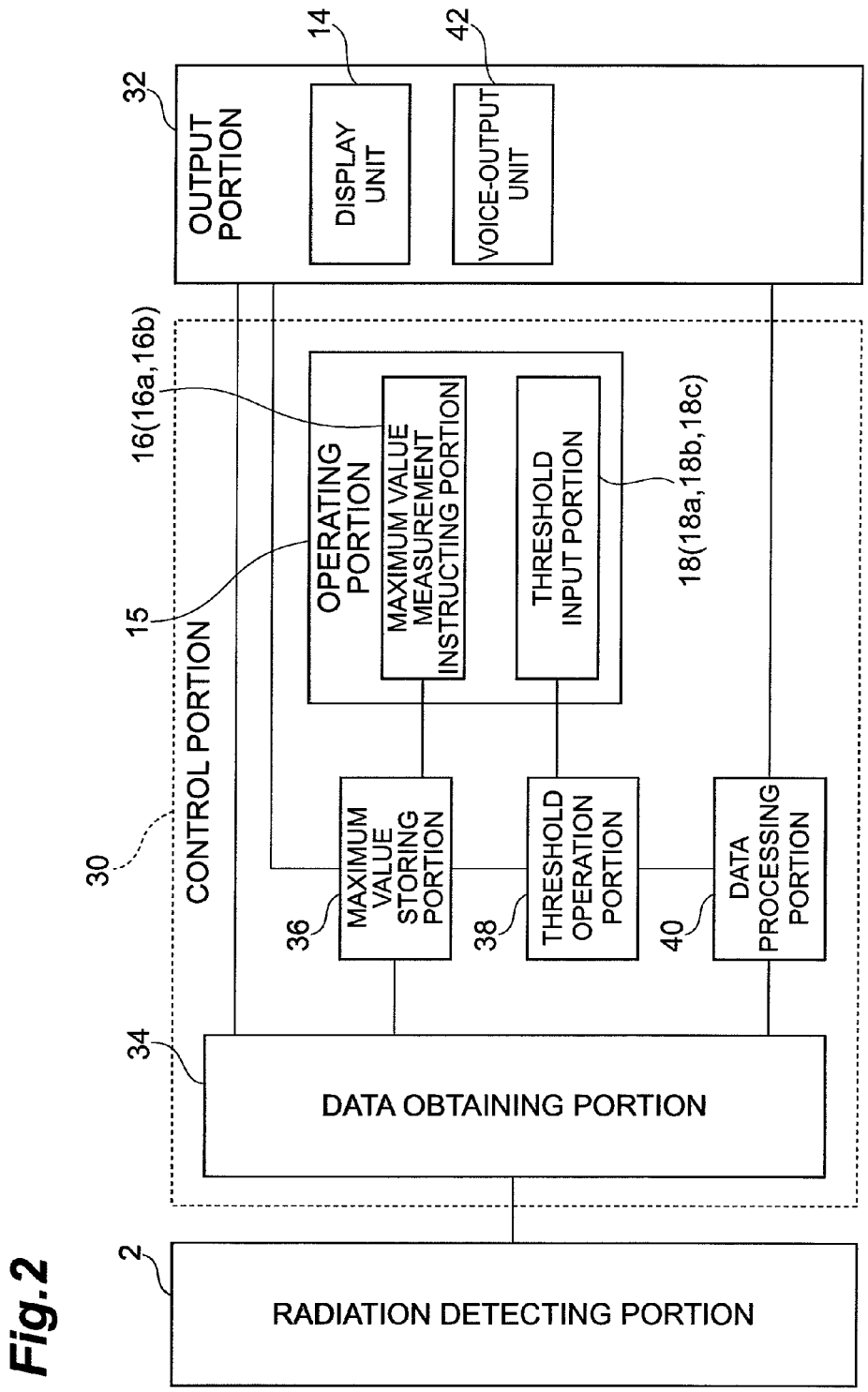
[FIG. 2] A functional block diagram of the radiation detector shown in FIG. 1.

FIG. 2 is a functional block diagram of the radiation detector 100. As shown in FIG. 2, the radiation detector 100 has a control portion 30 and an output portion 32 besides the radiation detecting portion 2. The control portion 30, the output portion 32, and a driving power (not shown) of these are included in the trunk portion 12 and handle 10 of the radiation detector 100.

The control portion 30 includes a data obtaining portion 34, a maximum value storing portion 36, a threshold operation portion 38, a data processing portion 40, and an operating portion 15.

The data obtaining portion 34 comprises a signal processing circuit electrically connected to the radiation detector element incorporated in the probe 22. In the following, description will be given for a case where the detection signal is a pulse signal.

The data obtaining portion 34 includes a preamplifier (not shown) that receives, as a detection signal, a pulse signal from the radiation detector element and amplifies the pulse signal and a main amplifier (not shown) that further amplifies the pulse signal. The data obtaining portion 34 further includes a pulse-height discriminator (not shown) that selects pulse signals having pulse heights equal to or more than a specific value from pulse signals amplified by the main amplifier. The pulse-height discriminator compares the pulse height of an amplified pulse signal with a predetermined threshold value. In the following, this threshold value will be called "a count decision threshold." This count decision threshold is used for selecting pulse signals having pulse heights equal to or more than a desired value from amplified pulse signals. The pulse-height discriminator generates an output pulse signal having a fixed pulse height only when having received from the main amplifier a pulse signal having a pulse height equal to or more than the count decision threshold. The data obtaining portion 34 further includes a scaler (not shown) that counts output pulse signals from the pulse-height discriminator. The detection signals generated by the radiation detecting portion 2 are counted in this manner.

The data obtaining portion 34 repeatedly generates an output signal indicating a count value of detection signals per a predetermined unit time at predetermined time intervals, and sends those output signals to the output portion 32, the maximum value storing portion 36, and the data processing portions 40. The level of the output signals is equivalent to a radiation count value per a predetermined unit time. Here, the radiation count value reflects the intensity of radiation made incident into the detecting portion. In the following, data equivalent to the radiation count value per unit time will be called "basic data."

The maximum value storing portion 36 continuously receives basic data from the data obtaining portion 34, and stores a maximum value of those basic data. This maximum value is sent to the threshold operation portion 38.

The threshold operation portion 38 calculates a detection alarm threshold by use of the maximum value of the basic data. This detection alarm threshold is used for judging whether to sound a detection alarm, and corresponds to "threshold" in the claims. A numerical expression used for calculating the detection alarm threshold will be described later. The threshold operation portion 38 sends the calculated detection alarm threshold to the data processing portion 40.

The data processing portion 40 is electrically connected to the data obtaining portion 34, and receives basic data from the data obtaining portion 34. The data processing portion 40 compares the detection alarm threshold sent from the threshold operation portion 38 with the basic data to determine whether to sound a detection alarm. The data processing portion 40, if having determined to sound a detection alarm, sends a notification control signal to a voice-output unit 42 of the output portion 32 to make the voice-output unit 42 sound a detection alarm. On the other hand, if it has been determined not to sound a detection alarm, no notification control signal is sent to the voice-output unit 42.

The operating portion 15 has a maximum value measurement instructing portion 16 and a threshold input portion 18. The maximum value measurement instructing portion 16 is operated to input, to the radiation detector 100, signals to start and stop a measurement of the maximum value of the basic data. The maximum value measurement instructing portion 16 includes, as input devices, a measurement start button 16a to input a start signal that instructs on starting a measurement of a maximum value and a measurement stop button 16b to input a stop signal that instructs on stopping that measurement. The threshold input portion 18 is operated to input, to the radiation detector 100, information to designate the detection alarm threshold. The threshold input portion 18 includes, as input devices, a coefficient increasing button 18a to input a signal that raises a coefficient (to be described later) used for calculating the detection alarm threshold, a coefficient reducing button 18b to input a signal that lowers that coefficient, and a threshold setting button 18c to input a signal that instructs on starting and ending designation of the detection alarm threshold.

The output portion 32 includes a display unit 14 and the voice-output unit 42. The display unit 14 receives the basic data from the data obtaining portion 34 in sequence, and displays a count value per unit time indicated by the basic data. The voice-output unit 42 is a unit to notify that the count value per unit time exceeds the detection alarm threshold, and sounds a detection alarm in response to the notification control signal from the data processing portion 40.

Figure 3:
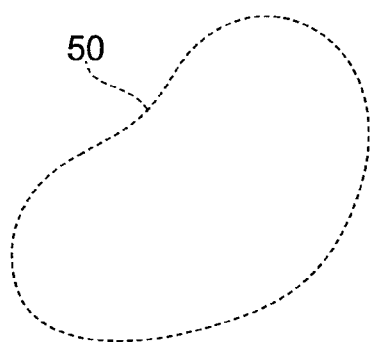
[FIG. 3] Explanatory views schematically showing a method for specifying a site where the radioactivity concentration is high.
Figure 3:
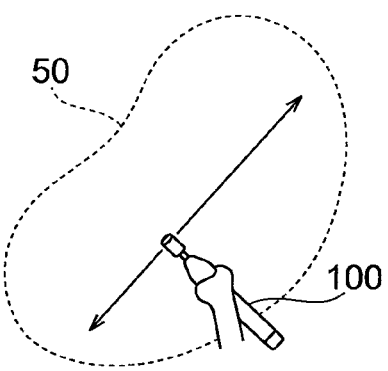
Figure 3:
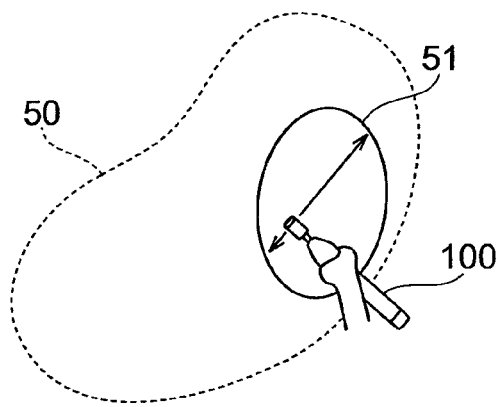
Figure 3:
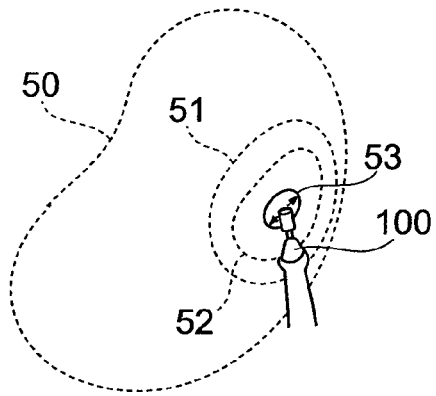
Figure 4:
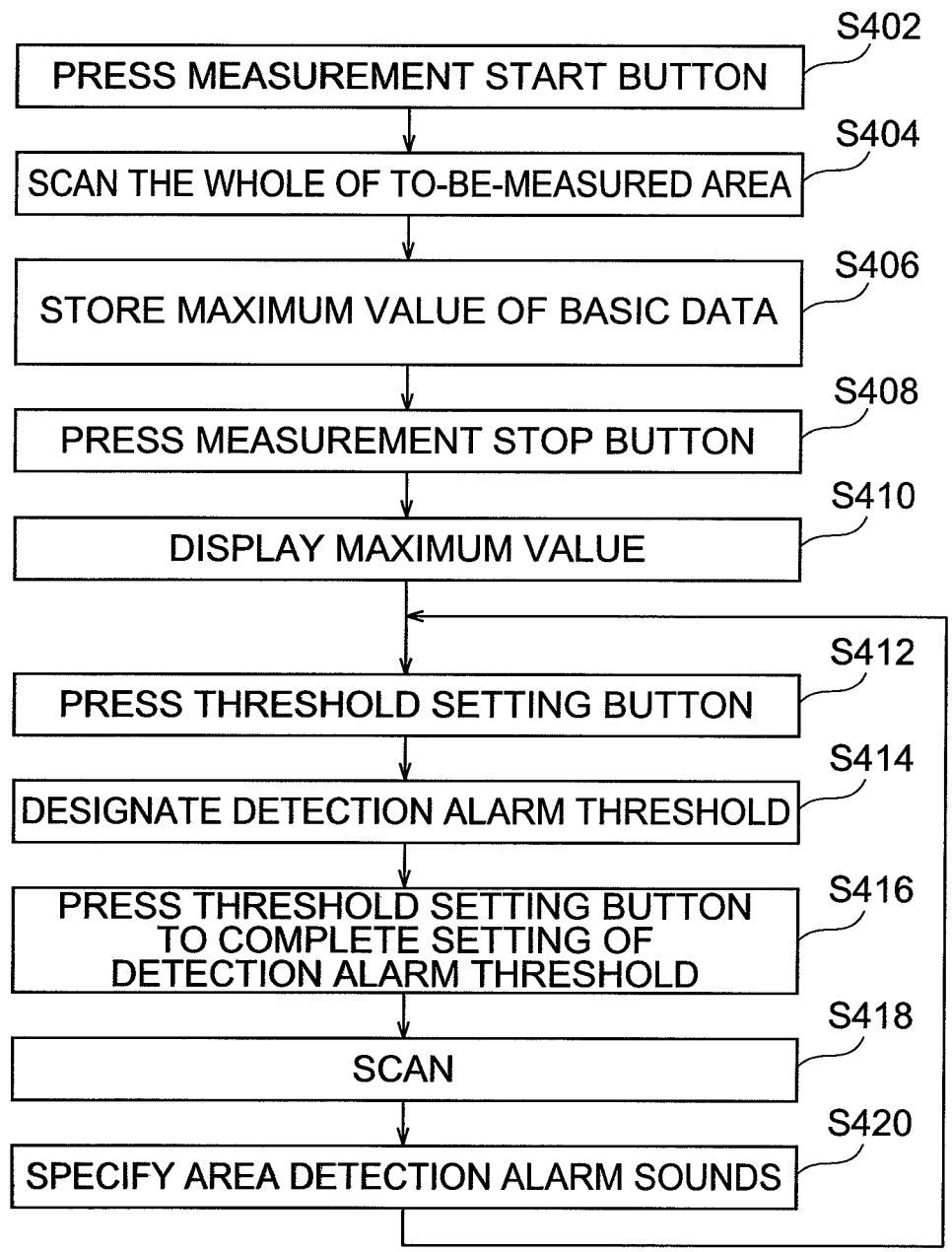
[FIG. 4] A flowchart showing procedures for specifying a site where the radioactivity concentration is high.

In the following, referring to FIG. 3 and FIG. 4, description will be given of a method for specifying a site where the radioactivity concentration is high by use of the radiation detector 100. FIG. 3 are explanatory views schematically showing this method, and FIG. 4 is a flowchart showing this method.

FIG. 3(*a*) shows a to-be-measured area 50 where radioactivity is distributed. The user specifies a site where radioactivity is concentrated in the to-be-measured area 50 by the following procedures. First, a maximum count value per unit time of radiation that comes flying from the area 50 is to be measured. For this, the user presses the detection start button 16a of the radiation detector 100 to input a start signal (step S402). Thereby, the radiation detector 100 is set to a maximum value measurement mode. Thus, in response to the depression of the detection start button 16a, the maximum value storing portion 36 is set so as to store the maximum value of the basic data, that is, the maximum count value per unit time.

Next, as shown in FIG. 3(*b*), the user moves the radiation detection probe 22 within the to-be-measured area 50 to scan the whole of the to-be-measured area 50 (step S404). In response thereto, the data obtaining portion 34 measures radiation across the whole of the to-be-measured area 50, and sends basic data equivalent to a count value per unit time to the maximum value storing portion 36 in sequence.

The maximum value storing portion 36 stores the maximum value of the basic data (step S406). The maximum value storing portion 36 includes a comparison circuit, and compares basic data received from the data obtaining portion 34 with basic data that has already been stored. If the received basic data is greater than the stored basic data, the maximum value storing portion 36 updates its memory contents to that received basic data. Thereby, the maximum value of the basic data is retained in the maximum value storing portion 36.

Once the scan of the whole of the to-be-measured area 50 ends, the user presses the measurement stop button 16b to input a stop signal (step S408). In response thereto, the maximum value measurement mode of the radiation detector 100 is cancelled. The maximum value storing portion 36 is set so as not to update its memory contents, and stops storing of the maximum value of the basic data. In addition, the maximum value stored in the maximum value storing portion 36 is sent to the display unit 14. The display unit 14 displays that maximum value as the maximum count value per unit time (step S410).

Next, the user presses the threshold setting button 18c (step S412). This makes it possible for the user to set the detection alarm threshold to judge whether to sound a detection alarm. The user operates the coefficient increasing button 18a and the coefficient reducing button 18b to input information to designate a coefficient n (0<n≦1) and thereby designates the detection alarm threshold (step S414). Every time the coefficient increasing button 18a and the coefficient reducing button 18b are pressed once, the coefficient n increases and decreases by predetermined increments and decrements.

Once the coefficient n is determined, the user again presses the threshold setting button 18c to complete setting of the detection alarm threshold (step S416). The threshold operation portion 38 calculates the detection alarm threshold according to the following expression.

$$Ct = n \times Cm \qquad (1)$$

Here, Ct denotes the detection alarm threshold, Cm denotes the maximum value of the basic data stored in the maximum value storing portion 36, and n denotes the aforementioned coefficient designated by the user.

The threshold operation portion 38 reads the maximum value Cm from the maximum value storing portion 36 in response to the second depression of the threshold setting button 18c, and performs the calculation of expression (1) using the coefficient n designated by use of the coefficient increasing button 18a and the coefficient reducing button 18b. The calculated detection alarm threshold Ct is sent to the data processing portion 40. Also, the inventors' experience indicates that the value of n used for the first threshold calculation is preferably ¼.

Next, the user moves the radiation detection probe 22 within the to-be-measured area 50 to again scan the whole of the to-be-measured area 50 (step S418). In response thereto, the data obtaining portion 34 sends basic data to the data processing portion 40. The data processing portion 40 compares this basic data with the detection alarm threshold calculated in step S416. If the basic data exceeds the detection alarm threshold, the data processing portion 40 sends a notification control signal to the voice-output unit 42 to make the voice-output unit 42 sound a detection alarm. On the other hand, if the basic data is equal to or lower than the detection alarm threshold, the data processing portion 40 does not generate a notification control signal, so that no detection alarm sounds.

The user specifies an area 51 where a detection alarm sounds within the to-be-measured area 50. If the detection alarm threshold has been properly set, as shown in FIG. 3(c), the area 51 where a detection alarm sounds is narrower than the to-be-measured area 50.

Thereafter, the user repeats the process in step S412 onward. That is, the user presses the threshold setting button 18c (step S412) and re-designates the detection alarm threshold (step S414). The user at this time presses the coefficient increasing button 18a to increase the coefficient n in order to raise the detection alarm threshold. Thereafter, the user presses the threshold setting button 18c to define the detection alarm threshold (step S416). Subsequently, the user moves the radiation detection probe 22 within the area 51 to scan the whole of the area 51 (step S418), and specifies an area 52 where a detection alarm sounds (step S420). Since the detection alarm threshold has risen in step S414, as shown in FIG. 3(d), the area 52 where a detection alarm sounds is narrower than the area 51.

By repeating such procedures, the area where a detection alarm sounds within the to-be-measured area 50 can be gradually reduced to the area 51, the area 52, and an area 53. The area where a detection alarm sounds under a higher threshold has a higher radioactivity concentration. Accordingly, by repeating the procedures of steps S412 to S418, a site where radioactivity is concentrated can be specified.

In the following, description will be given of advantages of the radiation detector 100. In the radiation detector 100, a user can designate a threshold to determine whether to sound a detection alarm. By repeating scanning within the to-be-measured area while gradually raising the threshold and thereby gradually narrowing the area where a detection alarm sounds, a site where radioactivity is concentrated can be specified. The threshold is calculated by use of the maximum value of basic data equivalent to the maximum count value of radiation and the coefficient n. Therefore, it is not necessary to obtain a background count value for determining the threshold. On the site of an actual radiation measurement, the background count value is sometimes high due to various factors, and in that case, how to take the background count value differs depending on the user. Therefore, if the threshold is calculated by use of the background count value, an appropriate threshold cannot be obtained, and there is a possibility that the measurement accuracy declines. In the present embodiment using no background count value, the measurement accuracy is not affected by a difference in the background obtaining method depending on the user. As a result, even when a radioactivity distribution with a low contrast (concentration gradient) is measured, by gradually raising the threshold, a site where radioactivity is concentrated can be easily and accurately specified.

In the above, the present invention has been described in detail based on its embodiment. However, the present invention is not limited to the aforementioned embodiment. The present invention can be variously modified within a range not deviating from the gist of the invention.

In the aforementioned embodiment, it is notified by a detection alarm from the voice-output unit 42 that the basic data has exceeded the detection alarm threshold. However, a notifying portion is not limited to the voice-output device, and another type of notification indicating that the basic data exceeds the detection alarm threshold may be executed. For example, the notifying portion may be the display unit 14. In this case, the display unit 14 may display predetermined notification information (for example, text and graphics) in response to a notification control signal from the data processing portion 40. In addition, the notifying portion may be a vibration mechanism. In this case, the vibration mechanism may vibrate the radiation detector 100 in response to a notification control signal from the data processing portion 40. Furthermore, the radiation detector may execute a plurality of notifications when the basic data has exceeded the detection alarm threshold.

In the aforementioned embodiment, the notifying portion performs notification (that is, the voice-output unit 42 sounds a detection alarm) when the whole of the to-be-measured area 50 is scanned for the second time onward. However, the notifying portion may also perform notification according to the size of the basic data at the time of a first scan of the to-be-measured area 50. In this case, the greater the basic data, the higher the output level of the notifying portion (for example, the greater the detection alarm) may become, and the greater the basic data, the shorter the execution interval of notification (for example, the shorter the time interval of a detection alarm that is sounded at a fixed time interval) may become.

In the aforementioned embodiment, by the user operating the threshold input portion 18 to designate the coefficient n, the detection alarm threshold is indirectly designated. However, the user may operate the threshold input portion so as to be able to directly designate the detection alarm threshold. In addition, considering the coefficient n as n=1−m (coefficient m satisfies 0≦m<1), the user may operate the threshold input portion 18 to designate the coefficient m.

In the aforementioned embodiment, the separate buttons 16a and 16b have been provided in order to input a start signal and a stop signal that instruct on starting and stopping a measurement of the maximum value of the basic data. However, a single switch may be provided in the radiation detector in order to input a start signal and a stop signal. In this case, either the start signal or stop signal is inputted according to an operation of the switch. For example, a start signal and a stop signal may be alternately inputted every time the switch is turned on and off, and in response thereto, the maximum value storing portion 36 may alternately start or stop storing of the maximum value. Alternatively, either the start signal or stop signal may be inputted according to a length of time for which the switch is pressed. For example, a signal that instructs on starting a measurement may be inputted when the switch is pressed long and a signal that instructs on stopping a measurement may be inputted when the switch is pressed short, or alternatively, vice versa. In addition, only a switch to input a start signal may be provided in the radiation detector and the maximum value of the basic data may be stored in the maximum value storing portion 36 for a predetermined time after the switch is turned on. In this case, it is necessary to complete scanning the whole to-be-measured area before the predetermined time elapses.

In the aforementioned embodiment, the two buttons of the coefficient increasing button 18a and the coefficient reducing button 18b have been provided as a coefficient instructing portion for inputting information to designate the coefficient n. However, in place of these, a single input unit such as a scale knob may be provided as a coefficient instructing portion.

In the aforementioned embodiment, the single button 18c has been provided in order to instruct on starting and ending designation of the detection alarm threshold. However, separate switches may be provided in order to instruct on starting and ending designation of the detection alarm threshold.

In the aforementioned embodiment, the detection signal from the radiation detecting portion 2 is outputted as a pulse signal, and the detection signals are counted. However, the detection signal from the radiation detecting portion 2 may be an electrical charge, the data obtaining portion 34 may accumulate the electrical charge from the radiation detecting portion 2 over a predetermined unit time, and a value reflecting a total amount of electrical charge thus accumulated may be handled as basic data. In this case as well, the basic data is equivalent to a radiation count value per that unit time.

As is apparent from the invention described above, the embodiment of the present invention may be modified in various ways. Such modifications do not depart from the scope of the present invention, and as is obvious for those skilled in the art, all such modifications are intended to be included in the scope of the claims which follow.

INDUSTRIAL APPLICABILITY

According to the radiation detector of the present invention, even when a radioactivity distribution with a low contrast (concentration gradient) is measured, a site where radioactivity is concentrated can be easily specified. In the radiation detector of the present invention, a user can designate a threshold to determine whether to make the notifying portion execute notification. The area where notification is executed under a higher threshold has a higher radioactivity concentration. By repeatedly scanning the to-be-measured area by use of the radiation detector of the present invention while gradually raising the threshold, the area where notification is executed is gradually narrowed. Consequently, even when a radioactivity distribution with a low contrast is measured, by repeating scanning while appropriately raising the threshold, a site where radioactivity is concentrated can be easily specified.

The invention claimed is:

1. A radiation detector comprising:
   a detecting portion that detects radiation to generate a detection signal;
   a data obtaining portion that generates basic data equivalent to a radiation count value per a predetermined unit time based on the detection signal;
   a first input device used for inputting a start signal that instructs on starting storing of a maximum value of the basic data;
   a storing portion that stores the maximum value of the basic data in response to the start signal;
   a second input device used for inputting information to designate a threshold to the basic data;
   a data processing portion that compares the basic data with the threshold and generates a notification control signal if the basic data exceeds the threshold; and
   a notifying portion that executes notification in response to the notification control signal.

2. The radiation detector according to claim 1, further comprising a threshold operation portion that calculates the threshold by use of the maximum value stored in the storing portion, wherein
   the threshold operation portion calculates the threshold according to the following expression:

$$Ct = n \times Cm$$

(here, Ct denotes the threshold, Cm denotes the maximum value, and a coefficient n satisfies 0<n≦1), and
   as the information to designate the threshold, information to designate the coefficient n is inputted by use of the second input device.

3. The radiation detector according to claim 1, further comprising a third input device used for inputting a stop signal that instructs on stopping storing of the maximum value, wherein
   the storing portion stops storing of the maximum value in response to the stop signal.

4. The radiation detector according to claim 3, comprising a single switch that functions as both the first and third input devices, wherein either the start signal or the stop signal is inputted according to an operation of the switch.

5. The radiation detector according to claim 1, wherein
   the detecting portion generates a pulse signal as the detection signal, and
   the data obtaining portion counts the pulse signal and generates a value reflecting a count value of the pulse signal per the unit time as the basic data.

6. The radiation detector according to claim 1, wherein
   the detecting portion generates an electrical charge as the detection signal, and
   the data obtaining portion generates a value reflecting a total amount of electrical charge received from the detecting portion over the unit time as the basic data.

* * * * *